(12) United States Patent
Hunter

(10) Patent No.: US 8,891,899 B2
(45) Date of Patent: *Nov. 18, 2014

(54) METHODS, SYSTEMS AND APPARATUSES FOR PIXEL VALUE CORRECTION USING MULTIPLE VERTICAL AND/OR HORIZONTAL CORRECTION CURVES

(71) Applicant: Micron Technology, Inc., Boise, ID (US)

(72) Inventor: Gregory Michael Hunter, San Jose, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 13/904,420

(22) Filed: May 29, 2013

(65) Prior Publication Data

US 2013/0258146 A1    Oct. 3, 2013

Related U.S. Application Data

(63) Continuation of application No. 11/889,214, filed on Aug. 9, 2007, now Pat. No. 8,463,068.

(51) Int. Cl.
| | | |
|---|---|---|
| G06K 9/40 | (2006.01) | |
| G09G 5/10 | (2006.01) | |
| H04N 5/357 | (2011.01) | |
| H04N 5/217 | (2011.01) | |
| H04N 9/07 | (2006.01) | |

(52) U.S. Cl.
CPC ........... *H04N 5/2173* (2013.01); *H04N 5/3572* (2013.01); *H04N 9/07* (2013.01)

USPC ............... 382/274; 382/275; 345/20; 345/77; 345/690; 348/251; 348/254

(58) Field of Classification Search
USPC .................. 382/274, 275; 348/251, 254, 255; 345/20, 63, 77, 589, 690–697; 358/461
See application file for complete search history.

(56) References Cited

U.S. PATENT DOCUMENTS

| | | | | |
|---|---|---|---|---|
| 4,731,652 | A | * | 3/1988 | Yamanaka .................... 348/251 |
| 4,970,598 | A | * | 11/1990 | Vogel ............................ 358/461 |
| 5,157,497 | A | * | 10/1992 | Topper et al. ................. 348/615 |
| 5,272,536 | A | | 12/1993 | Sudo et al. |
| 5,493,334 | A | | 2/1996 | Zortea et al. |
| 5,510,851 | A | * | 4/1996 | Foley et al. ................... 348/658 |
| 5,548,332 | A | * | 8/1996 | Topper et al. ................. 348/251 |
| 6,094,221 | A | | 7/2000 | Andersion |
| 6,734,905 | B2 | | 5/2004 | Fossum et al. |
| 6,747,757 | B1 | | 6/2004 | Enomoto |

(Continued)

OTHER PUBLICATIONS

English Translation of WO2005/043891 to Fujita et al. (May 12, 2005).*

(Continued)

*Primary Examiner* — Aaron W Carter

(74) *Attorney, Agent, or Firm* — Dickstein Shapiro LLP

(57) ABSTRACT

Methods, systems and apparatuses are disclosed for approximating vertical and horizontal correction values in a pixel value correction calculation. Multiple vertical and/or horizontal correction curves are used and may be employed for one or more color channels of the imager. The use of multiple correction curves allows for a more accurate approximation of the correction curves for image pixels.

26 Claims, 8 Drawing Sheets

(56) References Cited

U.S. PATENT DOCUMENTS

| | | | |
|---|---|---|---|
| 6,912,307 B2 | 6/2005 | Spitzer et al. | |
| 6,937,777 B2 | 8/2005 | Shirakawa | |
| 6,989,872 B2* | 1/2006 | Nakatsuji et al. | 348/806 |
| 7,391,450 B2 | 6/2008 | Pinto et al. | |
| 7,457,478 B2* | 11/2008 | Aoyama et al. | 382/275 |
| 7,499,082 B2* | 3/2009 | Iga | 348/222.1 |
| 7,782,380 B2 | 8/2010 | Hunter et al. | |
| 8,078,001 B2* | 12/2011 | Hunter | 382/275 |
| 8,331,722 B2* | 12/2012 | Hunter | 382/274 |
| 8,463,068 B2* | 6/2013 | Hunter | 382/274 |
| 8,478,066 B2* | 7/2013 | Fujita et al. | 382/274 |
| 8,620,102 B2* | 12/2013 | Hunter | 382/274 |
| 2002/0094131 A1 | 7/2002 | Shirakawa | |
| 2002/0135705 A1* | 9/2002 | Nakatsuji et al. | 348/806 |
| 2003/0234864 A1 | 12/2003 | Matherson et al. | |
| 2003/0234872 A1 | 12/2003 | Matherson et al. | |
| 2004/0027451 A1 | 2/2004 | Baker | |
| 2004/0032952 A1 | 2/2004 | Pinto et al. | |
| 2004/0155970 A1 | 8/2004 | Johannesson et al. | |
| 2005/0041806 A1 | 2/2005 | Pinto et al. | |
| 2005/0053307 A1 | 3/2005 | Nose et al. | |
| 2005/0174437 A1* | 8/2005 | Iga | 348/222.1 |
| 2005/0179793 A1 | 8/2005 | Schweng | |
| 2005/0213159 A1* | 9/2005 | Okada et al. | 358/3.26 |
| 2006/0033005 A1 | 2/2006 | Jerdev et al. | |
| 2007/0025625 A1 | 2/2007 | Burian et al. | |
| 2007/0164925 A1 | 7/2007 | Song | |
| 2007/0211154 A1 | 9/2007 | Mahmoud et al. | |
| 2008/0002037 A1* | 1/2008 | Ueda | 348/223.1 |
| 2008/0055430 A1* | 3/2008 | Kirsch | 348/241 |
| 2008/0175514 A1 | 7/2008 | Nose et al. | |
| 2008/0191985 A1* | 8/2008 | Katayama et al. | 345/89 |
| 2008/0279471 A1* | 11/2008 | Hunter | 382/260 |
| 2008/0297816 A1 | 12/2008 | Nikkanen et al. | |
| 2008/0309824 A1* | 12/2008 | Liang et al. | 348/607 |
| 2009/0040371 A1* | 2/2009 | Hunter | 348/425.1 |
| 2009/0175556 A1* | 7/2009 | Hunter | 382/274 |
| 2009/0190006 A1* | 7/2009 | Huggett et al. | 348/241 |
| 2010/0135595 A1* | 6/2010 | Du et al. | 382/275 |
| 2011/0298943 A1* | 12/2011 | Hunter | 348/222.1 |
| 2013/0257919 A1* | 10/2013 | Kimura et al. | 345/690 |
| 2013/0258146 A1* | 10/2013 | Hunter | 348/246 |

OTHER PUBLICATIONS

Manoj Aggarwal et al., "On Cosine-fourth and Vignetting Effects in Real Lenses", 2001 IEEE, pp. 472-479.

Ian Powell, "Technique employed in the development of antivignetting filters", Opt. Eng. 36 (1) 268-272, Jan. 1997.

Wonpil Yu et al., "Vignetting Distortion Correction Method for High Quality Digital Imaging", Proceeding of the 17th International Conference on Pattern Recognition (ICPR '04).

Wonpil Yu, "Practical Anti-vignetting Methods for Digital Cameras", IEEE Transactions on Consumer Electronics, vol. 50, No. 4, Nov. 2004.

Yin-Pao Chen et al., "An Anti-Vignetting Technique for Super Wide Field of View Mosaicked Images", Journal of Imaging Technology, vol. 12, No. 5, Oct. 1986.

M. Onoe, et al., "Real-Time Shading Corrector for a Television Camera Using a Microprocessor", Real-Time/Parallel Computing, Volume: Plenum: NY, pp. 339-346, 1981.

Its'Hak Dinstein et al., "Imaging System Response Linearization and Shading Correction", 1984, IEEE, pp. 204-209.

Solene Quelard, "Image Quality Improvement for a CMOS Mobile Phone Digital Camera", Royal Institute of Technology, Feb. 2004, pp. 1-71.

* cited by examiner

METHODS, SYSTEMS AND APPARATUSES FOR PIXEL VALUE CORRECTION USING MULTIPLE VERTICAL AND/OR HORIZONTAL CORRECTION CURVES

CROSS-REFERENCE TO RELATED APPLICATIONS

This application is a continuation of U.S. patent application Ser. No. 11/889,214, filed on Aug. 9, 2007, now U.S. Patent No. 8,463,068, the subject matter of which is incorporated in its entirety by reference herein.

FIELD OF THE INVENTION

Embodiments relate generally to generation of pixel value correction surfaces accounting for pixel value variations caused by parameters causing spatial variation.

BACKGROUND OF THE INVENTION

Imagers, for example CCD, CMOS and others, are widely used in imaging applications, for example, in digital still and video cameras.

It is well known that, for a given optical lens used with a digital still or video camera, the pixels of the pixel array will generally have varying signal values even if the imaged scene is uniform. The varying responsiveness often depends on a pixel's spatial location within the pixel array. One source of such variation is caused by lens shading. Roughly, lens shading causes pixels in a pixel array located farther away from the center of the pixel array to have a lower value when compared to pixels located closer to the center of the pixel array, when the camera is exposed to the same level of light stimulus. Other sources may also contribute to variations in pixel value with spatial location. These variations can be compensated for by adjusting, for example, the gain applied to the pixel values based on spatial location in a pixel array. For lens shading correction, for example, it may happen that the further away a pixel is from the center of the pixel array, the more gain is needed to be applied to the pixel value. Different color channels of an imager may be affected differently by various sources of shading. In addition, sometimes an optical lens is not centered with respect to the optical center of the image sensor; the effect is that lens shading may not be centered at the center of the imager pixel array. Each color channel may also have a different center, i.e., the pixel with the highest response.

Variations in the shape and orientation of photosensors used in the pixels may contribute to a non-uniform spatial response across the pixel array. Further, spatial non-uniformity may be caused by optical crosstalk or other interactions among the pixels in a pixel array. Further, changes in the optical state of a given lens, such as changes in iris opening or focus position, may affect the spatial pattern of non-uniformity among the lenses. Different lenses and/or cameras will generally produce different patterns of non-uniform spatial response from a given pixel array.

Variations in a pixel signal caused by the spatial position of a pixel in a pixel array can be measured and the pixel response value can be corrected with a pixel value gain adjustment. Lens shading, for example, can be corrected using a set of positional gain adjustment values, which adjust pixel values in post-image capture processing. With reference to positional gain adjustment to correct for shading variations with a fixed optical state configuration, gain adjustments across the pixel array can typically be provided as pixel signal correction values, one corresponding to each of the pixels. For color sensors, the set of pixel correction values for the entire pixel array forms a gain adjustment surface for each of a plurality of color channels. The gain adjustment surface is then applied to the pixels of the corresponding color channel during post-image capture processing to correct for variations in pixel value due to the spatial location of the pixels in the pixel array. For monochrome sensors, a single gain adjustment surface is applied to all the pixels of the pixel array.

"Positional gain adjustments" across the pixel array are provided as correction values, one correction value corresponding to each of the pixels and applied to the pixel values during post-image capture processing.

One method of determining spatial pixel correction values is to approximate desired vertical and horizontal correction values for each pixel in a pixel array by using one vertical and one horizontal correction value curve which is determined for the pixels. A vertical correction value curve (Fy(y)) provides a correction value for each row. A horizontal correction value curve (Fx(x)) provides a correction value for each column.

For each color channel, the correction value may be represented in as similar manner as that in co-pending U.S. patent application Ser. No. 10/915,454, entitled CORRECTION OF NON-UNIFORM SENSITIVITY IN AN IMAGE ARRAY, filed on Aug. 11, 2004, ("the '454 application"), and Ser. No. 11/514,307, entitled POSITIONAL GAIN ADJUSTMENT AND SURFACE GENERATION FOR IMAGE PROCESSING, filed on Sep. 1, 2006 ("the '307 application") which are incorporated herein in their entirety by reference. The correction value may be determined as shown in Equation (1):

$$F_c(x,y) = Fx_c(x) + Fy_c(y) + k_c * Fx_c(x) * Fy_c(y) + 1 \qquad (1)$$

where c is the channel, where $Fx_c(x)$ is a horizontal correction value curve for that channel, where $Fy_c(y)$ is a vertical correction value curve for that channel, and where $k_c * Fx_c(x) * Fy_c(y)$ (the "cross term") is used to increase/decrease the lens correction values in the pixel array corners. In the '454 application, the value of the vertical correction value curve at a given row is the vertical correction value for that row and is the same for each pixel in the row. Likewise, the value of the horizontal correction value curve at a given column is the horizontal correction value for that column and is the same for each pixel in the column. The total correction is a function of the vertical and horizontal correction, as shown in Equation (1).

One problem with using one vertical and one horizontal correction value curve as above to approximate the desired vertical and horizontal correction values for an entire pixel array is that typically when a particular pixel is located away from the column/row on which the vertical/horizontal correction value curve is centered, the less closely the value calculated in accordance with Equation (1) may model the desired column/row correction values for that particular pixel.

In the '454 application, typically, the single vertical correction value curve for a pixel array corresponds to the correction value curve for a reference center column of the pixel array and, also typically, the single horizontal correction value curve for a pixel array corresponds to the correction value curve for a reference center row of the pixel array. That is, for a given channel, $Fx_c(x)$ and $Fy_c(y)$ are usually calibrated such that the gain required at the brightest pixel (generally, the center pixel) is equal to one. Thus, assuming the center of color channel c is located at (0, 0), then $Fx_c(0) = Fy_c(0) = 0$. Thus, generally, at the center row, the correction value is calculated as $F_c = Fx_c(x) + Fy_c(y) + 1 = Fx_c(x) + 1$ and at the center column, the correction value is calculated as $F_c = Fx_c(x) + Fy_c(y) + 1 = Fy_c(y) + 1$. (The cross term doesn't appear because along the center row and along the center column the cross term ($k_c*Fx_c(x)*Fy_c(y)$) is also equal to zero). It follows that $F_c(0,0)=1$. (Note that multiplying by a correction factor of one has no effect on the pixel value.) This means that $Fx_c(x)$ and $Fy_c(y)$ are typically calibrated such that $F_c(x, y)$ depicts vertical correction values for pixels along the centermost column of the pixel array and horizontal correction values for pixels along the centermost row of the pixel array with sufficient accuracy. However, a vertical correction value curve that would correct, for example, a column on the right side of the pixel array with sufficient accuracy could be much different than the vertical correction value curve desired for correcting the center reference column. Accordingly, a correction surface based on a single vertical correction value curve may not correct the entire pixel array to a desired accuracy because the vertical correction values determined from the single correction value curve, even if adjusted by the cross term and $Fx_c(x)$, will not always yield a correction value that closely maps to desired values on columns positioned relatively far away from the center column, for example, on either side of the pixel array. Analogously, there may be no choice of values for the single horizontal correction value curve provided in the '454 application that will correct the entire pixel array to a desired accuracy.

Accordingly, methods, systems and apparatuses for more accurately representing and calculating desired correction values for the entire pixel array for use in pixel value correction are desired.

DETAILED DESCRIPTION OF THE INVENTION

Figure 1A:
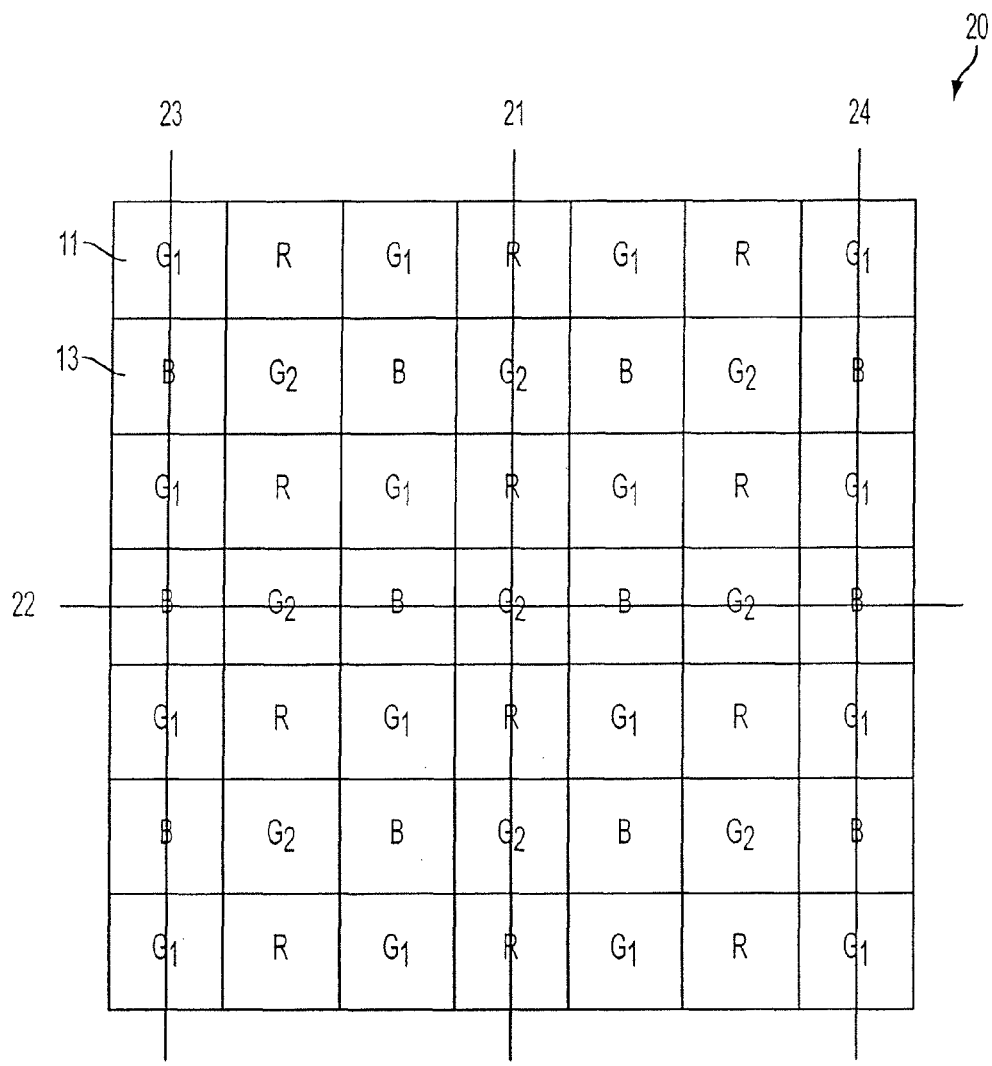
FIG. 1A depicts an imager array surface showing the location of vertical and horizontal correction value curves, according to disclosed embodiments.
Figure 1B:
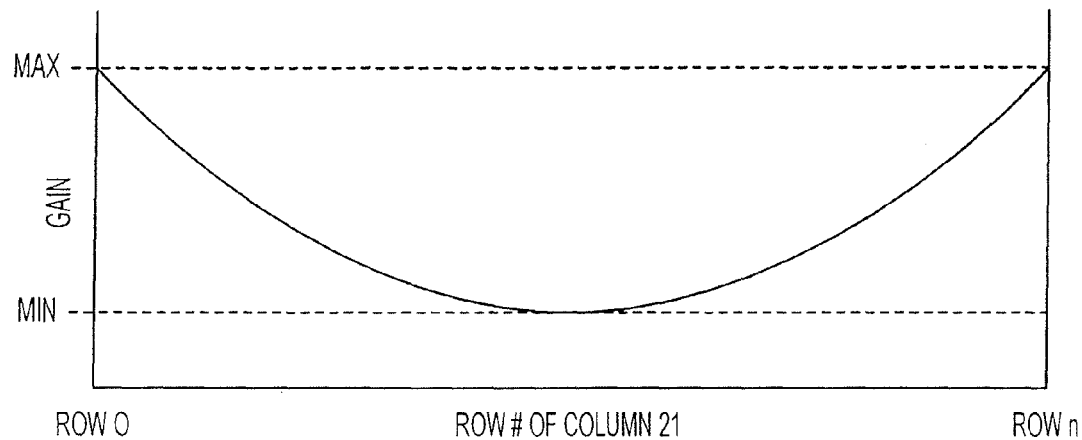
FIGS. 1B-1E depict graphical examples of vertical and horizontal correction value curves.
Figure 1C:
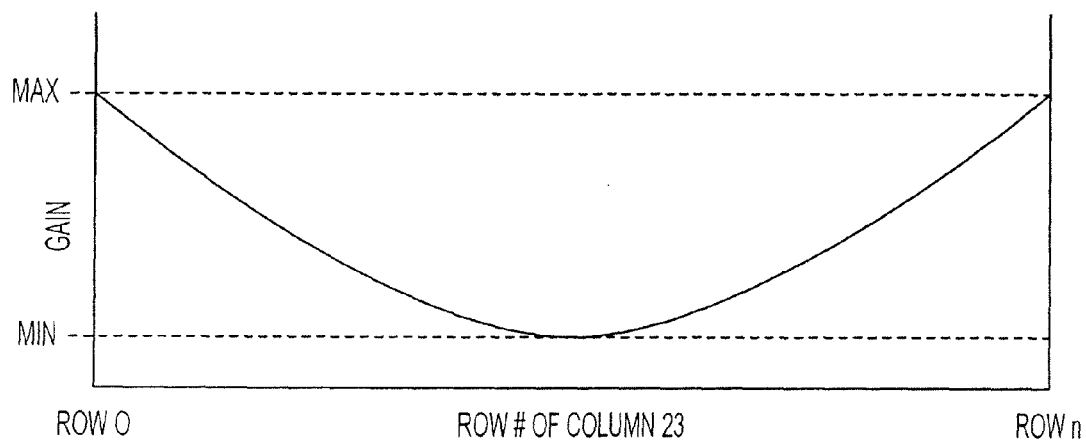
Figure 1D:
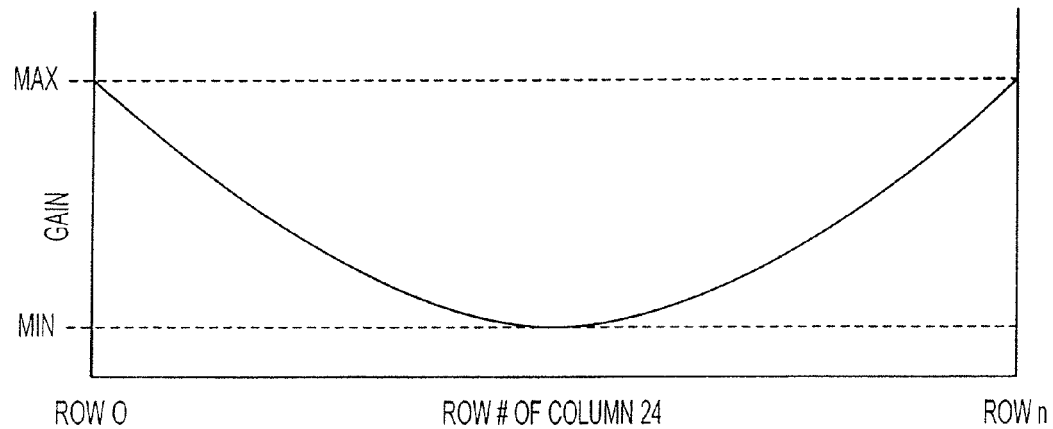
Figure 1E:
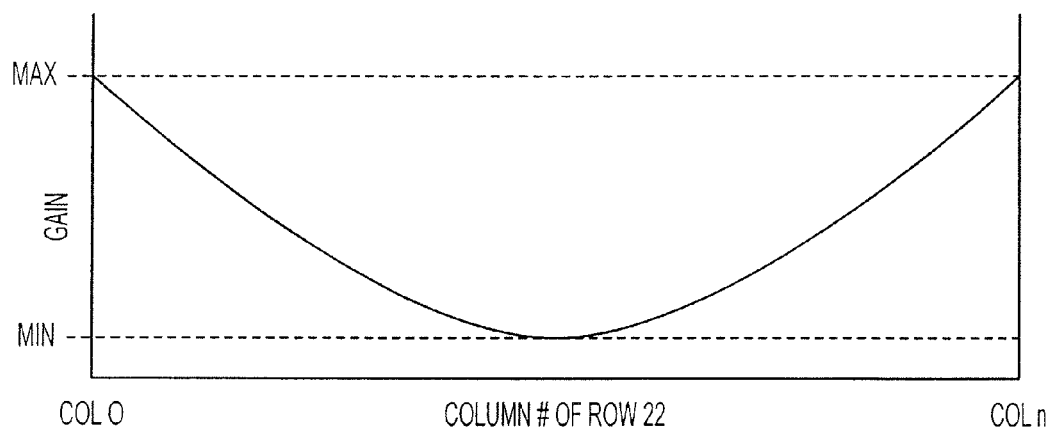

In the following detailed description, reference is made to the accompanying drawings which form a part hereof, and in which are shown by way of illustration specific disclosed embodiments. These disclosed embodiments are described in sufficient detail to enable those skilled in the art to make and use them, and it is to be understood that structural, logical or procedural changes may be made. Particularly, in the description below, processing is described by way of flowchart. In some instances, steps which follow other steps may be in reverse or in a different sequence except where a following procedural step requires the presence of a prior procedural step. The processes illustrated in the flowcharts can be implemented using hardware components including an ASIC, a processor executing a program, or other signal and/or image processing hardware and/or processor structures or any combination thereof. For example, these processes may be implemented as a pixel processing circuit which may be provided in an image processor of a solid state imager device, but are not limited to such an implementation.

For purposes of simplifying description, the disclosed embodiments are described in connection with performing positional gain adjustment on the pixels of a captured image affected by lens shading. However, the disclosed embodiments may also be used for any other spatial pixel value corrections, or more generally, corrections required due to interaction among imperfections or practical limitations or variations in the designs and layout of imaging device components, etc. For example, a given lens or filter may contribute to the pixel circuits' having varying degrees of sensitivity depending upon their geographic locations in the array. Further, variations in the shape and orientation of photosensors and other elements of the pixel circuits may also contribute to non-uniformity of pixel sensitivity across the imager.

Positional gain adjustment (PGA) refers to the process of compensating for non-uniform pixel values depending on pixel positions in an array, when the camera is exposed to a scene having uniform irradiance, in each channel, throughout the scene. As stated, for purposes of description, disclosed embodiments are described with reference to positional gain adjustment, used as a non-limiting example. Finally, the disclosed embodiments are generally described with reference to a single color channel; however, it should be understood that each color channel may be separately corrected with a separate correction function, $F_c(x, y)$, or the embodiments may be applied to a monochrome imager.

Correction values are determined by correction functions that determine a corrected pixel value, P(x, y) based upon the pixel's location in the pixel array. In the following equations, "x" represents a column number and "y" represents a row number. A corrected pixel value, P(x, y), is equal to a readout pixel value output from the sensor array, $P_{IN}(x, y)$, multiplied by the correction function, F(x, y) as shown in Equation (2) below:

$$P(x,y)=P_{IN}(x,y)*F(x,y) \tag{2}$$

The corrected pixel value P(x, y) represents a value of the pixel corrected for the pixel's location in the pixel array. It the context of positional gain adjustment, the correction values are gain adjustments applied to each pixel value. The readout pixel value $P_{IN}(x, y)$ is the value for the pixel that is acquired by the pixel array, where "x" and "y" define the location of the pixel in the pixel array, x being the column location of the pixel and y being the row location of the pixel. Thus, F(x, y) is a correction surface for the entire pixel array. It should be noted that a corrected pixel value is not limited to the value of the readout pixel value output from the sensor array multiplied by the value of a correction function, but it may also be a function of more than one correction value and/or pixel values of pixels neighboring the pixel, in addition to the pixel's own value. Each correction value is determined from a correction surface, in accordance with disclosed embodiments.

One possible representation of a correction function for a particular pixel is described in the '454 application and the '307 application and shown in Equation (3):

$$F(x,y)=Fx(x)+Fy(y)+k*Fx(x)*Fy(y)+G \tag{3}$$

where Fx(x) represents a piecewise-quadratic correction function in the x-direction, Fy(y) represents a piecewise-quadratic correction function in the y-direction, k*Fx(x)*Fy(y) is used to increase or decrease the lens correction values toward the array corners, and where G represents a "global" constant offset (increase or decrease) applied to every pixel in the pixel array, regardless of pixel location. The expression k*Fx(x)*Fy(y) is referred to as a "cross-term" while k is sometimes referred to as the "corner factor." The value of G is typically +1. It should be noted that disclosed embodiments are not limited to the correction function in Equation (3), but alternative suitable correction functions may be used. It should further be noted that while the value of G is typically +1, especially for positional gain adjustment applications, that the value of G is not limited as such and may be the same or vary among different color channels as well.

The Fx(x) and Fy(y) functions may also be referred to as horizontal and vertical correction value curves, respectively. As above, horizontal and vertical correction value curves are used to determine pixel correction values F(x, y) for each pixel in a pixel array. For simplicity, descriptions herein are in terms of a monochrome image, for which the same correction applies to each color channel; however, disclosed embodiments may also apply to each channel of multiple color channel applications. Correction values may be calculated from the Fx(x) and Fy(y) functions by evaluating the function F(x, y) at a particular x or y location. The horizontal curve (Fx(x)) is a function in the x (column number or location) direction, which determines a horizontal correction value for each pixel, based on the x value (column location) of the pixel. The vertical curve (Fy(y)) is a function in the y (row number or location) direction, which determines a vertical correction value for each pixel, based on the y value (row location) of the pixel. As noted, the sum of a single vertical and a single horizontal correction value curve plus the cross term plus G (or 1) have been used to approximate desired correction values for all pixels in a pixel array.

Disclosed embodiments provide methods of storing and evaluating correction surfaces that provide improved correction values when compared to correction values that are based on single stored vertical and horizontal correction value curves in post-image capture processing (or during scan out of the array, pixel-by-pixel). This improvement is made possible by providing multiple stored vertical and/or horizontal correction value curves. The horizontal and vertical correction value curves are pre-stored and may be represented in memory as the actual values of the multiple Fx(x) and/or Fy(y) functions or as parameters which can be used to generate the functions as needed during image processing. The stored vertical and/or horizontal correction value curves may be used to interpolate/extrapolate additional curves from which correction values for pixel values may be determined. It should also be noted that although the correction value curves, Fx(x) and Fy(y) are described throughout as piecewise-quadratic functions, they may take the form of any other suitable function, such as piecewise-cubic, polynomial, etc, or any combination thereof. Also, it may not be necessary to include the cross term, depending on the surface desired to be generated.

Corrections for pixel spatial location in a pixel array may also be separately performed for each color channel of the pixel array. For example, for an RGB array, the red, green and blue pixels fruit red, green and blue color channels, respectively. Each of these color channels may be adjusted separately. Thus, for each channel of an RGB array, different stored vertical and horizontal correction value curves may be used to determine appropriate correction values for the pixels of the channel. A separate correction value may be calculated for each channel, based on its own Fx(x) and Fy(y) as represented by stored parameters. Channels could also represent signals outside of the visible spectrum. As in the '307 application, two green channels may be separately corrected. Also, channels other than the typical RGB channels may be used.

One disclosed embodiment is now described with reference to FIGS. 1A, 1B, 1C, 1D, 1E, 2, 3 and 4. FIG. 1A depicts an imager pixel array 20 with a standard Bayer color array including red (R), green ($G_1$, $G_2$) and blue (B) color channels. Note that FIG. 1A illustrates only a portion of a pixel array and that generally, much larger arrays, such as 320×240, with a possible correspondingly larger number vertical/horizontal curves may be used. The imager pixel array 20 of FIG. 1A has three vertical correction value curves associated with pixel columns 21, 23, 24 (and also associated with respective color channels) and one horizontal correction value curve associated with pixel row 22. Each vertical correction value curve is associated with a given column in the pixel array 20. Note that there is only one correction value curve per column per color channel. Analogously, in an embodiment in which there is more than one horizontal correction value curve, then each horizontal correction value curve is associated with a given row in the pixel array 20. Again, note that there is only one correction value curve per row per color channel. If the desired correction values are the same for all color channels of the pixel array 20, then the same vertical and horizontal correction value curves are applied in the same way to each color channel. However, in this embodiment, each color channel has its own vertical and horizontal correction value curves. A surface for a given channel may be defined by curves on rows or columns not used by the channel, e.g., $G_2$ does not have pixels in column 23, but column 23 can be used to define and generate the surface for $G_2$. Thus, the surface for a channel may be defined by curves of rows or columns not used by the channel, so long as desired values are computed for the pixels used. Throughout, $G_1$ and $G_2$ will be referred to as separate color channels, such that each is correctly independently in possible disclosed embodiments.

For a Bayer color array of one possible disclosed embodiment, depicted in FIG. 1A, row 11 alternates color channels $G_1$, R, $G_1$, R, . . . and subsequent row 13 alternates color channels B, $G_2$, B, $G_2$, . . . . Any given row, therefore, has two color channels, either $G_1$ and R or $G_2$ and B. Similarly, any given column has two color channels, either $G_1$ and B or $G_2$ and R. Nonetheless, there are four vertical correction value curves, one for each color channel, for each of columns 23, 24 and 21. For row 22 there is one horizontal correction value curve for each color channel. However, in other embodiments, each channel can have stored curves for specific rows or columns, even if different rows or columns are used for another channel's stored curves (i.e., in other embodiments, one or more channels or one or more sets of channels may have its own different configuration of rows and columns with associated curves).

Referring to FIGS. 1A-1E, the vertical and horizontal correction value curves are described in more detail. For simplicity, one representative vertical or horizontal pixel correction value curve is represented for each of columns 21, 23 and 24 and row 22. However, there is typically a correction value curve for each color channel for processing color images, for a given row or column. FIGS. 1B-1E illustrate examples of vertical or horizontal correction value curves corresponding to each of columns 21, 23 and 24 and row 22 of FIG. 1A. As can be seen from these figures, less correction is required near the center of the pixel array as compared to the amount of correction required near the edges of the pixel array. During calibration of an embodiment employing a particular camera, optics and/or optical state, each correction value curve to be stored is determined. This is done by determining the correction value curve that produces in the desired image result—a sufficiently uniform output image of an imaged scene, such as a gray card under uniform illumination. In the current example, separate pixel correction functions (curves), Fy(y), for each of columns 21, 23 and 24, and Fx(x), for row 22, are determined. As described above, each row or column having a correction value curve can have one curve to be used for more than one channel or may have multiple associated curves to be applied to separate channels. The latter would typically apply in the case of positional gain adjustment for color images. Values of the correction value curves, or parameters which can be used to generate the correction value curves and associated correction values, are then stored in memory for columns 21, 23 and 24 and row 22. A correction value curve for each of columns 21, 23 and 24 and row 22 is depicted in FIGS. 1B-1E. The Fx(x) or Fy(y) functions may be evaluated from stored parameters by the same procedures as in the '454 application or by any other method.

Figure 2:
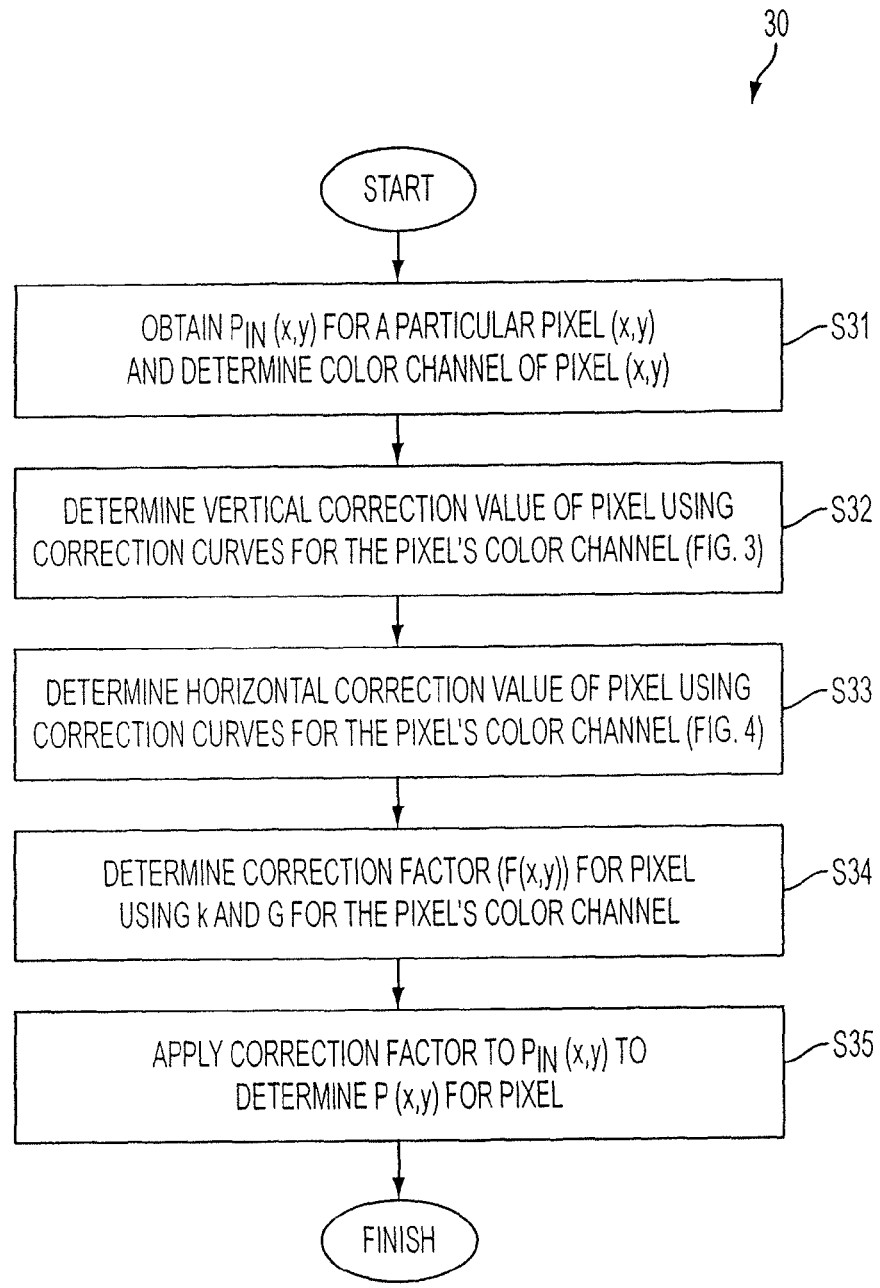
FIG. 2 is a flowchart illustrating the steps of determining a corrected pixel value according to disclosed embodiments.

Referring to FIG. 2, a method 30 for determining a corrected pixel value P(x, y) for a particular pixel (x, y) of a particular color channel is now described. At step S31, the readout pixel value $P_{IN}(x, y)$ is obtained from an image and the color channel of the pixel is determined. The vertical and horizontal correction values, corresponding to the vertical and horizontal correction value curves, are determined for the particular pixel (x, y) in steps S32 and S33, respectively. At step S34, the vertical and horizontal correction values are used in conjunction with Equation (3), described above, to determine the value of the correction function, F(x, y) for the particular pixel. (Note, that the k value may also be different for each quadrant of the pixel array as well as for each color channel.) Then, at step S35, the correction function is applied in Equation (2), described above, to the particular pixel's readout pixel value $P_{IN}(x, y)$, to determine the corrected pixel value P(x, y). If correction per color channel is not employed, then step S31 need not determine the color channel of a pixel; correction values are determined in the same manner for every pixel, using a single set of stored curves. Likewise, this may be done "n" times, if "n" parameters are needed for pixel correction (e.g., for non-positional gain adjustment applications). Steps S32 and S33 of this process are described in more detail below.

Figure 3:
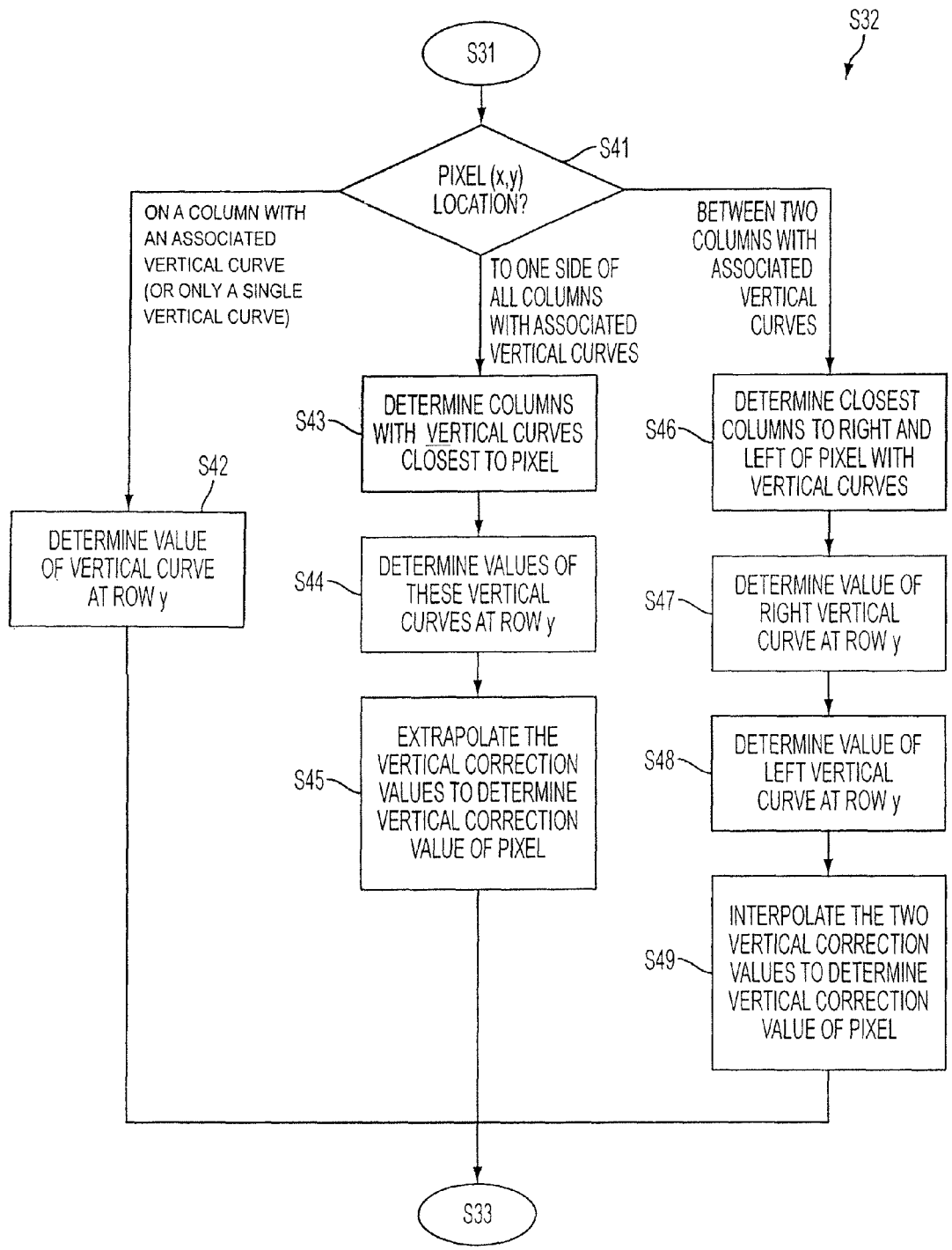
FIG. 3 is a flowchart illustrating a step of FIG. 2 in more detail.

Referring now to FIG. 3, step S32 is described in more detail, referring implicitly to the curves and any parameters for the particular pixel's color channel. At step S41, the particular pixel's location relative to the columns of the pixel array with corresponding vertical correction value curves (for the pixel's color channel) stored in memory is established. Pixels may be located in one of three locations. These locations are (1) on a column with a corresponding stored correction value curve, i.e., on one of columns 21, 23, 24 (FIG. 1A), (2) to one side of all columns with corresponding stored correction value curves and (3) between two columns with corresponding stored correction value curves. It should also be noted that all curves and other parameters used are those corresponding to the pixel's color channel, as determined at step S31 of FIG. 2.

If the pixel is located on a column with a corresponding vertical correction value curve or if there is only one vertical correction value curve, the vertical correction value for the pixel is the value of the vertical correction value curve (Fy(y)), evaluated at that pixel's row, row y, and is determined at step S42. The vertical correction value for the particular pixel is the value of the corresponding vertical correction value curve evaluated at the row in which the particular pixel is located.

If there are multiple columns, for pixels which lie to one side of all columns with corresponding vertical correction value curves, the vertical correction value of the particular pixel is determined by combining vertical correction values for that pixel's row, as determined for the vertical correction value curves associated with the two columns closest to the pixel, as follows. In step S43, the two columns with associated vertical correction value curves located closest to the particular pixel are determined. Then, at step S44, the vertical correction values for each of these vertical correction curves are determined for the particular pixel's row. In step S45, the vertical correction value for the pixel itself is determined by an extrapolation of the vertical correction values determined in step S44.

For pixels that lie between two columns with corresponding vertical correction value curves, the vertical correction value of the particular pixel is determined by combining vertical correction values for that pixel's row. The vertical correction values that are combined are those associated with the two columns with corresponding vertical correction value curves that are the closest, one to the right and one to the left, to the particular pixel, as follows. First, the closest column with a corresponding vertical correction value curve lying to the right of the pixel and the closest column with a corresponding vertical correction value curve lying to the left are identified at step S46. Then the value of each of these vertical correction value curves is determined at step S47 or S48, respectively, based on the row location of the pixel. In step S49, the vertical correction value for the pixel itself is determined by an interpolation of the vertical correction values determined in steps S47 and S48.

A weighted linear interpolation/extrapolation may be employed to determine a vertical correction value from the two contributing vertical correction values. One possible method of weighting may be based upon the ratio of (a) the number of pixels between the column of the particular pixel and one of the closest columns to (b) the number of pixels between the column of the particular pixel and the other of the closest columns. However, it should be understood that non-linear interpolation/extrapolation functions may also be used. One benefit of using linear interpolation/extrapolation is that it is very cost effective.

Figure 4:
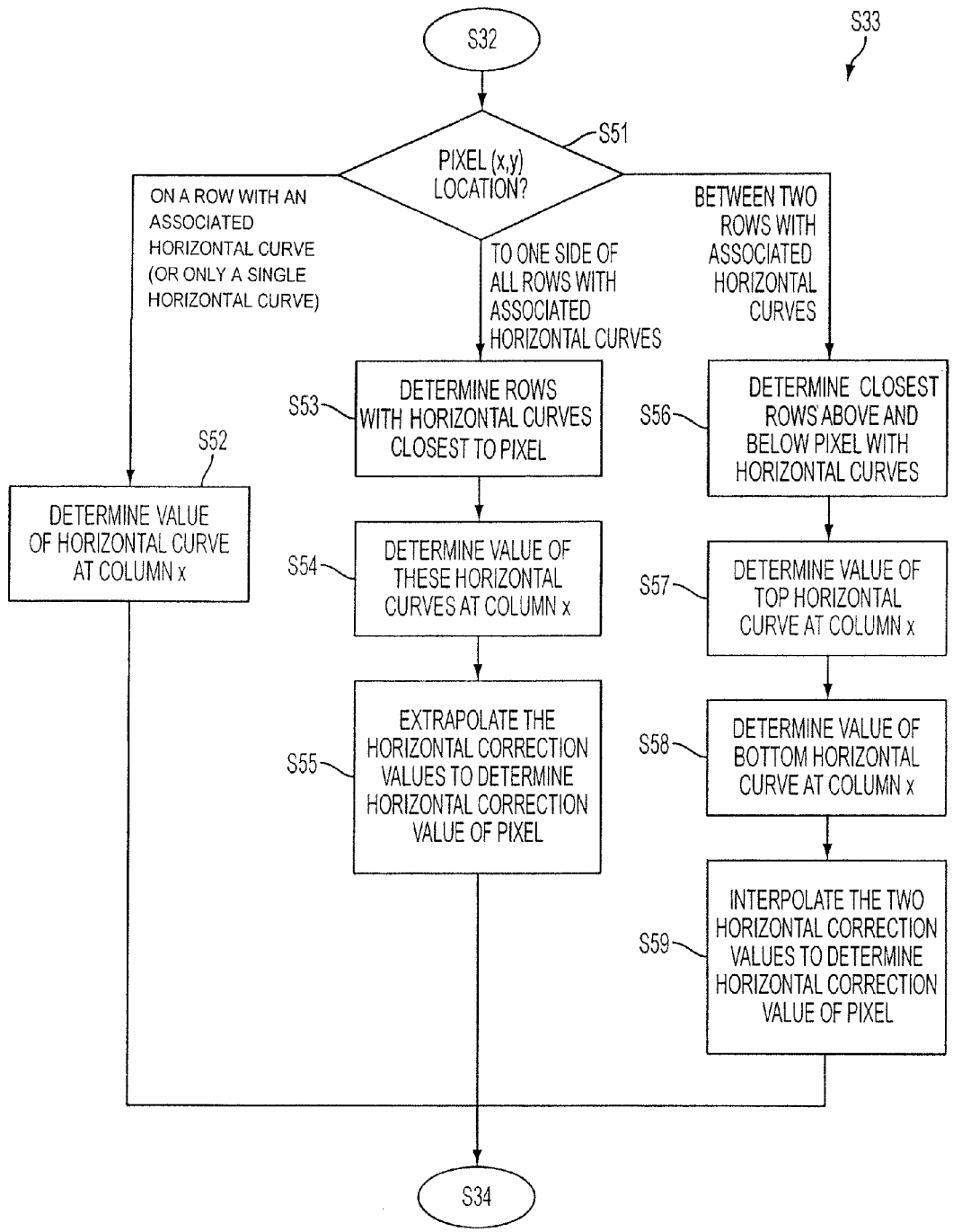
FIG. 4 is a flowchart illustrating a step of FIG. 2 in more detail.

Referring now to FIG. 4, step S33 is described in more detail. The steps S51 through S59 of FIG. 4, correspond to steps S41 through S49 respectively, described above with relation to FIG. 3, except that they relate to horizontal, rather than vertical, correction value curve calculations. At step S51, the particular pixel's location relative to the rows of the pixel array with corresponding horizontal correction value curves is established. If the pixel is located on a row with a corresponding horizontal correction value curve or if there is only one horizontal correction curve, the horizontal correction value for the pixel is the value of this horizontal correction value curve (Fx(x)), evaluated at the pixel's column, column x, and is determined at step S52. The horizontal correction value for the particular pixel is the value of the corresponding horizontal correction value curve evaluated at the column in which the pixel is located. It should be noted that all curves and other parameters correspond to the pixel's color channel, as determined at step S31 of FIG. 2.

If there are multiple rows, for pixels which lie to one side of all rows with corresponding horizontal correction value curves, the horizontal correction value of the particular pixel is determined by combining horizontal correction values for that pixel's column, as determined for the horizontal correction value curves associated with the two rows closest to the pixel, as follows. In step S53, the two rows with associated horizontal correction value curves that are located closest to the particular pixel are determined. Then, at step S54, the horizontal correction values for each of these horizontal correction value curves is determined for the particular pixel's column. In step S55, the horizontal correction value for the pixel itself is determined by an extrapolation of the horizontal correction values of these horizontal correction value curves evaluated at the column in which the pixel is located.

For pixels that lie between two rows with corresponding horizontal correction value curves, the horizontal correction value of the particular pixel is determined by combining horizontal correction values for that pixel's column. The horizontal correction values that are combined are those associated with the two rows with corresponding horizontal correction value curves that are the closest above and the closest below the particular pixel, as follows. First, the closest row with a corresponding horizontal correction value curve above the pixel and the closest row with a corresponding horizontal correction value curve below the pixel are identified at step S56. Then the horizontal correction value of each of these horizontal correction value curves is determined at step S57 or S58, respectively, based on the column location of the pixel. In step S59, the horizontal correction value for the pixel itself is detei mined by an interpolation of the horizontal correction values of these horizontal correction value curves evaluated at the column in which the pixel is located.

As with determination of the vertical correction values, a weighted linear interpolation/extrapolation may be employed to determine a horizontal correction value from the two contributing horizontal correction values. One possible method of weighting may be based upon the ratio of (a) the number of pixels between the row of the particular pixel and one of the closest rows to (b) the number of pixels between the row of the particular pixel and the other of the closest rows. However, it should be understood that non-linear interpolation/extrapolation functions may also be used. One benefit of using linear interpolation/extrapolation is that it is very cost effective.

Typically each Fy(y) would be evaluated only once per row, since it does not change for a given row, from one pixel to the next. Determination of such a value at a given pixel may consist of reading a previously computed value from a register; this register need be updated only once per scanned line. For calculation in real time, as pixels are scanned out from a sensor array, one row being scanned out before the next, disclosed embodiments may compute vertical correction value curves (updating the value of each vertical correction value curve only once per scanned row) using the same value of each curve for every pixel in a row, for efficiency. When computing horizontal correction value curves, the value of the horizontal correction value curve must be updated for each pixel in the scanned row. This difference occurs because the vertical correction value curve calculations are dependent on the row number of the pixel, which remains the same for all pixels within a given row, whereas the horizontal correction value curve calculations are dependent on the column number of the pixel, which is different for every pixel in a given row. Accordingly, when rows are corrected one after the other, it is generally more efficient to use more vertical correction value curves than horizontal correction value curves because more or faster circuitry, more power, or a faster processor may be required for calculating horizontal correction values as rapidly as pixels are scanned out along a row than for calculating vertical values that change only for each row.

For images from different cameras, the ideal number and configuration of vertical and horizontal correction value curves may vary. For example, three vertical correction value curves and one horizontal correction value curve are implemented in the example shown in FIG. 1A. One of the vertical correction value curves maps through the center column 21 of the pixel array 20 while the other two correction value curves map through columns on the right 23 and left 24 sides of the pixel array 20. The horizontal correction value curve maps through the center row of the pixel array. For color images, typically, each color channel has its own set of vertical and horizontal correction value curves and associated rows and columns and any other parameters used, such as k (Equation (3)).

To determine if an adequate combination of correction value curves is being utilized, the results obtained using the corrected pixel values P(x, y) (from Equation (2) using the correction function Equation (3) based on the vertical/horizontal correction values calculated from the stored correction value curves as described above with reference to FIGS. 2-4) are evaluated for uniformity; an image of a gray card under uniform illumination should have a sufficiently uniform color throughout, as desired. Similarly, for a non-positional gain adjustment application, the desired correction may be based on factors other than uniformity of the image. For a particular camera, if a comparison between the results obtained from imager calibration and the results obtained using three vertical and one horizontal correction value curves yields acceptable results, then the correction method may use only the three vertical correction value curves and one horizontal correction value curve (per color channel, for independent corrections of each of several color channels). If the comparison does not yield acceptable results, then the number of vertical and/or horizontal correction value curves may be modified, and the correction retested, until acceptable results are achieved. Thus, an optimum combination may be determined for a given camera type, when selecting an embodiment to produce.

The number and placement of row and column curves may be selected to try to optimize cost and expected performance quality for a particular camera, or in the case of an image sensor processor, a family of cameras to be supported by the image sensor processor. Testing a candidate design may be as simple as application of the design, for example, in simulation, to an image of a gray card using uniform illumination captured by a subject camera.

In some cases, it may be beneficial to use more than one horizontal correction value curve, notwithstanding the additional circuitry cost required. This determination is the result of a balancing between the benefit of getting the best approximation of the desired corrected pixel values and the cost of the pixel processing circuit, the amount of power required and/or the amount of processing time required. For example, three horizontal and five vertical correction value curves may be more desirable than one horizontal and 17 vertical correction value curves, even though horizontal correction value curve circuitry, in general, is more expensive, because increasing the number of horizontal correction value curves may achieve a better approximation of desired pixel correction values. This may depend on the camera to be used, the circuitry technology available, processor technology and/or other variables.

Typically, to determine the curves to be used for a particular camera, optimal central row and column curves are first developed/calibrated for example with all other curves neutralized or turned off and imaging a uniform field with the camera. This can be done as discussed in the '454 application or in the '307 application.

Suppose, however, that significant shading remains in a corner of a captured image, which is a common occurrence for systems with only one vertical and one horizontal correction curve per channel. An additional vertical curve is defined at or near the image edge, near the corner, with the same values as the central vertical curve previously optimized for the center column. The values of the new curve are then varied, with the new curve enabled to contribute to the final correction results, in accordance with the invention, until the desired values are obtained along the associated column, rendering the processed image more uniform along that column, and in its vicinity, and in particular in the corner of concern.

Similarly, another column may be added if there remains shading in another region. Analogously, rows may be added and adjusted. Various combinations are tried until a sufficiently cost-effective design is achieved for a given camera or family of cameras for which the design is intended. Then the number and placement of extra rows and columns is fixed. The design of disclosed embodiments may permit the placement of one or more rows to be programmable.

A similar procedure is used, once a design is fixed, to determine the best curve values to be used for a particular camera. Typically, a central row and column are first calibrated for each color channel. Each subsequently calibrated curve is calibrated while holding fixed the parameters and curves of the previously calibrated curves. As previously discussed, for positional gain adjustment applications, typically $Fx(x)$ and $Fy(y)$ are equal to zero along the center column and row, respectively, such that the cross term is equal to zero along the central axes. In other embodiments, the cross term may be omitted if sufficient accuracy of correction is achieved, such as if sufficiently many curves are provided to enable the desired accuracy of correction without the cross terms.

In a further embodiment, a vertical curve may be stored as a function that defines the difference at each pixel between the desired correction along the associated column and the correction calculated from some other vertical curve having an associated column. For example, if a representation of a vertical curve for the center column is stored, a left-hand column could have a corresponding stored function, where the actual vertical curve that would be used for the left-hand column would be the sum of the vertical curve stored for the center column and the stored function for the left-hand column. The description of this embodiment applies to horizontal curves as well. This implementation may save storage space, as only the differences need to be stored for the left-hand column, in this example, rather than the actual curve itself. More computation may be required, however, since as the correction curve is generated, two curves must first be generated and then summed, to get the final correction value at the particular pixel.

Figure 5:
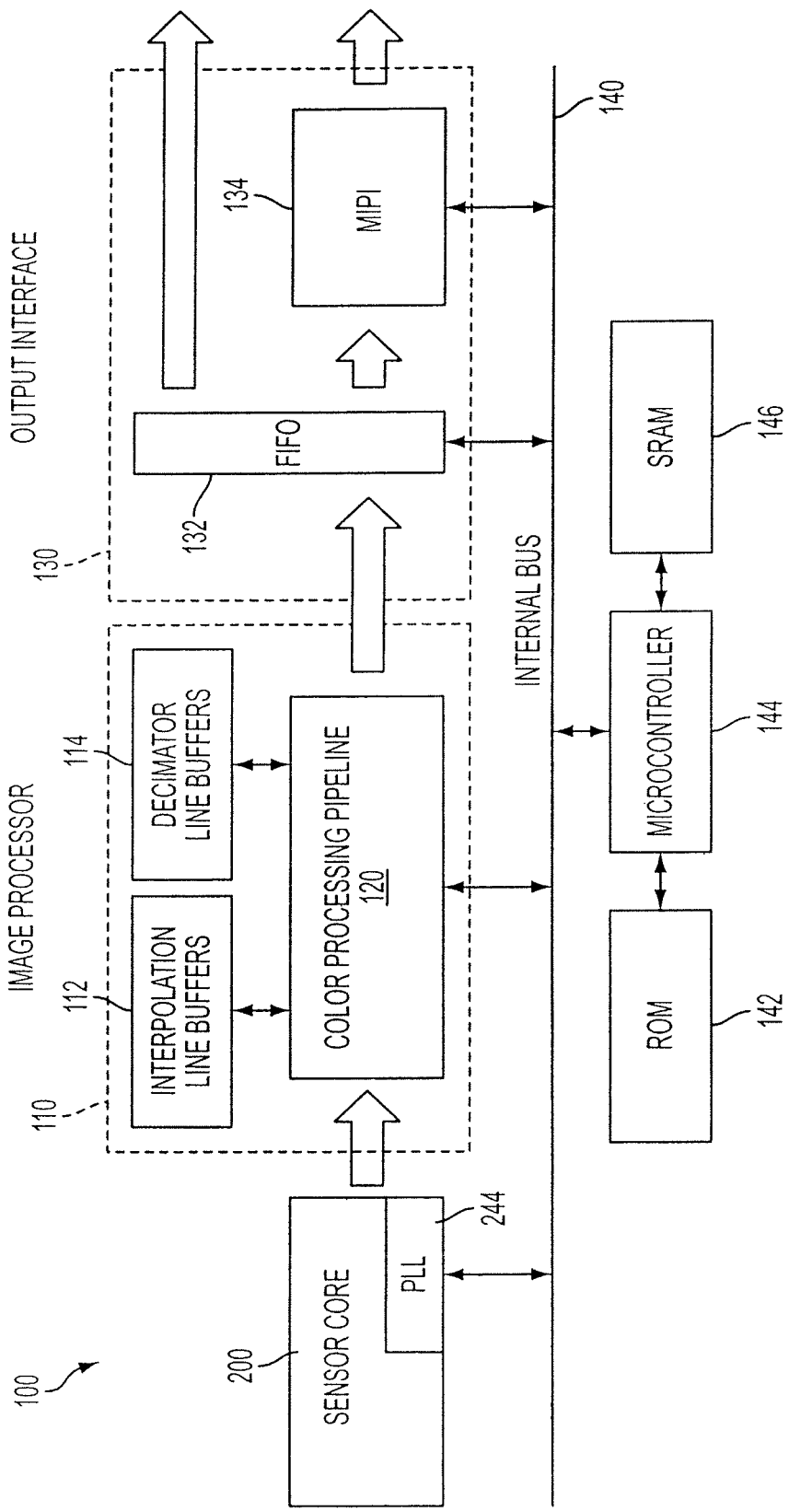
FIG. 5 depicts a block diagram of a system-on-a-chip imager according to disclosed embodiments.

FIG. 5 illustrates a block diagram of a system-on-a-chip (SOC) imager 100 constructed in accordance with disclosed embodiments. The system-on-a-chip imager 100 may use any type of imager technology, CCD, CMOS, etc.

The imager 100 comprises a sensor core 200 that communicates with an image processor 110 that is connected to an output interface 130. A phase lock loop (PLL) 244 is used as a clock for the sensor core 200. The image processor 110, which is responsible for image and color processing, includes interpolation line buffers 112, decimator line buffers 114, and a color processing pipeline 120. One of the functions of the color processing pipeline 120 is the performance of positional gain adjustment in accordance with the disclosed embodiments, discussed above.

The output interface 130 includes an output first-in-first-out (FIFO) parallel buffer 132 and a serial Mobile Industry Processing Interface (MIPI) output 134, particularly where the imager 100 is used in a camera in a mobile telephone environment. The user can select either a serial output or a parallel output by setting registers in a configuration register within the imager 100 chip. An internal bus 140 connects read only memory (ROM) 142, a microcontroller 144, and a static random access memory (SRAM) 146 to the sensor core 200, image processor 110, and output interface 130. The read only memory (ROM) 142 may serve as a storage location for the correction values or the parameters used to generate the correction value curves and associated correction values as needed.

While disclosed embodiments have been described for use in correcting positional gains for an acquired image, disclosed embodiments may be used for other pixel corrections as well.

When employed in a video camera, pixel corrections may be employed in real time for each captured frame of the video image.

As noted, disclosed embodiments may be implemented as part of an image processor 110 and can be implemented using hardware components including an ASIC, a processor executing a program, or other signal processing hardware and/or processor structure or any combination thereof.

Disclosed embodiments may be implemented as part of a camera such as e.g., a digital still or video camera, or other image acquisition system, and may also be implemented as stand-alone software or as a plug-in software component for use in a computer, such as a personal computer, for processing separate images. In such applications, the process can be implemented as computer instruction code contained on a storage medium for use in the computer image-processing system.

Figure 6:
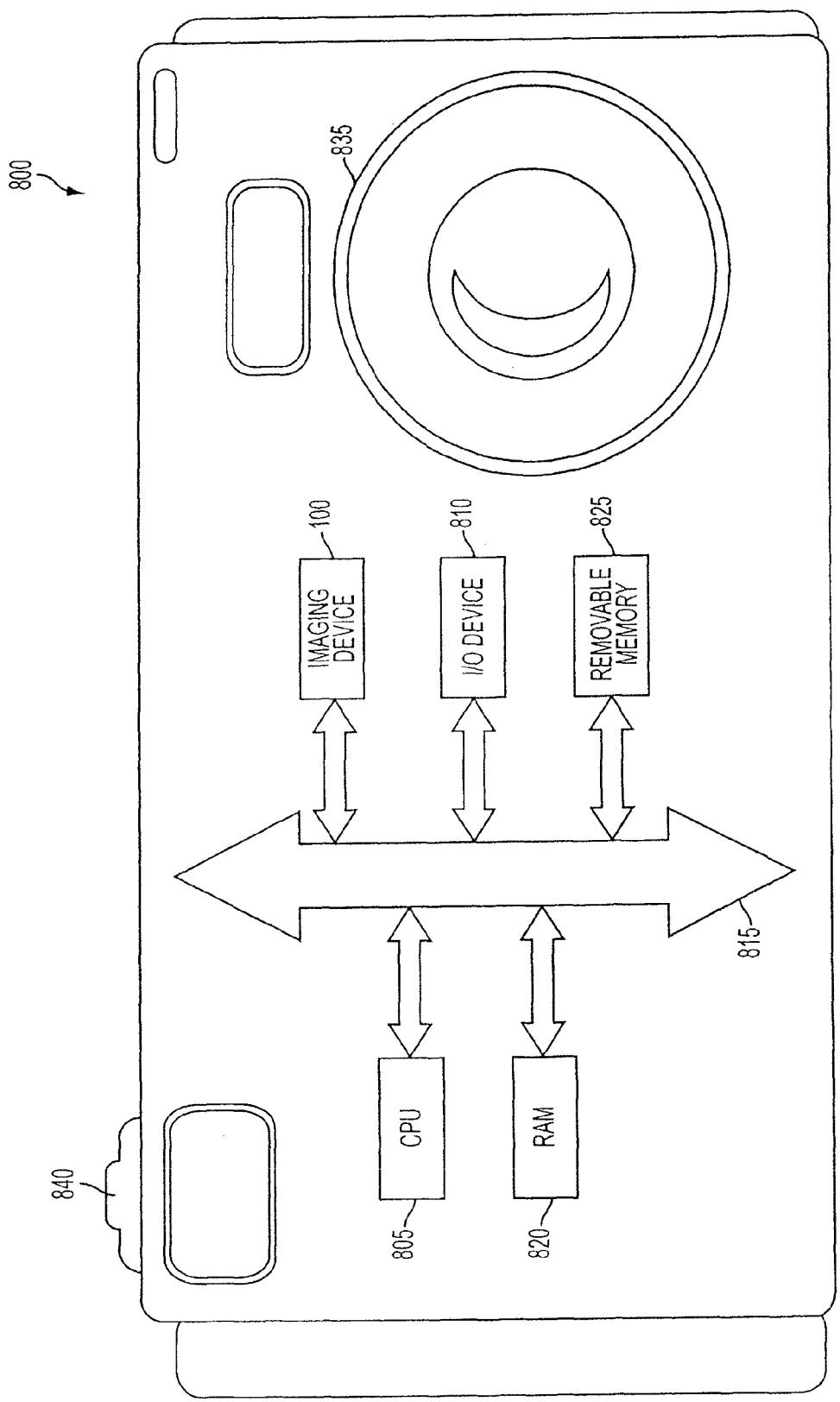
FIG. 6 depicts a processing system, for example, a digital still or video camera, which may employ an imager constructed in accordance with disclosed embodiments.

For example, FIG. 6 illustrates a processor system as part of a digital still or video camera system 800 employing a system-on-a-chip imager 100 as illustrated in FIG. 5, which imager 100 provides for positional gain adjustment and/or other pixel value corrections using vertical and horizontal correction value curves, as described above. The processing system includes a processor 805 (shown as a CPU) which implements system, e.g. camera 800, functions and also controls image flow and image processing. The processor 805 is coupled with other elements of the system, including random access memory 820, removable memory 825 such as a flash or disc memory, one or more input/output devices 810 for entering data or displaying data and/or images and imager 100 through bus 815 which may be one or more busses or bridges linking the processor system components. A lens 835 allows images of an object being viewed to pass to the imager 100 when a "shutter release"/"record" button 840 is depressed.

The camera system 800 is an example of a processor system having digital circuits that could include image sensor devices. Without being limiting, such a system could also include a computer system, cell phone system, scanner system, machine vision system, vehicle navigation system, video phone, surveillance system, star tracker system, motion detection system, image stabilization system, and other image processing systems.

Although the disclosed embodiments employ a pixel processing circuit, e.g., image processor 110, which is part of an imager 100, the pixel processing described above and illustrated in FIGS. 2-4 may also be carried out on a stand-alone computer in accordance with software instructions and vertical and horizontal correction value curves and any other parameters stored on any type of storage medium.

As described above, the disclosed embodiments of the invention describe a method providing more accurate approximations of desired correction surfaces for use in calculating pixel correction values at a given cost of circuit area, power, memory, bandwidth, processing time required, etc.

While several embodiments have been described in detail, it should be readily understood that the invention is not limited to the disclosed embodiments. Rather the disclosed embodiments can be modified to incorporate any number of variations, alterations, substitutions or equivalent arrangements not heretofore described.

What is claimed as new and desired to be protected by Letters Patent of the United States is:

1. An imaging device comprising:
   a pixel array comprising a plurality of pixels arranged in columns and rows, the pixel array outputting a plurality of pixel signals, each pixel signal corresponding to a particular pixel of the pixel array;
   an adjustment circuit coupled to the pixel array and configured to correct at least one of the plurality of pixel signals by:
   determining a correction value for a pixel signal to be adjusted, the correction value being based on a respective row and a respective column of the pixel corresponding to the pixel signal to be adjusted, and at least one of a vertical correction value portion and a horizontal correction value portion; and
   applying the correction value to the pixel signal,
   wherein the vertical correction value portion for the pixel signal to be adjusted is determined from at least one of a plurality of vertical correction value curves, the number of vertical correction value curves being less than the number of columns in the pixel array, each of the plurality of vertical correction value curves representing vertical correction value portions for all pixels in a particular column of the pixel array with which the respective vertical correction value curve is associated, and
   wherein the horizontal correction value portion for the pixel signal to be adjusted is determined from at least one of a plurality of horizontal correction value curves, the number of horizontal correction value curves being less than the number of rows in the pixel array, each of the plurality of horizontal correction value curves representing horizontal correction value portions for all pixels in a particular row of the pixel array with which the respective horizontal correction value curve is associated.

2. The imaging device of claim 1, wherein the vertical correction value portion for the pixel signal to be adjusted is the value of the vertical correction value curve representing the column of the pixel corresponding to the pixel signal to be adjusted at a row in which the pixel is located, when the pixel is located on a column associated with a vertical correction value curve.

3. The imaging device of claim 1, wherein the vertical correction value portion for the pixel signal to be adjusted is an extrapolation of the values of at least two vertical correction value curves closest to the pixel corresponding to the pixel signal to be adjusted at a row in which the pixel is located, when the pixel is located on a column to one side of all columns associated with vertical correction value curves.

4. The imaging device of claim 1, wherein the vertical correction value portion for the pixel signal to be adjusted is an interpolation of the value of a vertical correction value curve closest to one side of the pixel corresponding to the pixel signal to be adjusted and the value of a vertical correction value curve closest to a second side of the pixel, at a row in which the pixel is located, when the pixel is located on a column between columns respectively associated with vertical correction value curves.

5. The imaging device of claim 1, wherein the horizontal correction value portion for the pixel signal to be adjusted is the value of the horizontal correction value curve representing the row of the pixel corresponding to the pixel signal to be adjusted at a column in which the pixel is located, when the pixel is located on a row associated with a horizontal correction value curve.

6. The imaging device of claim 1, wherein the horizontal correction value portion for the pixel signal to be adjusted is an extrapolation of the values of at least two horizontal correction value curves closest to the pixel corresponding to the pixel signal to be adjusted at a column in which the pixel is located, when the pixel is located on a row to one side of all rows associated with horizontal correction value curves.

7. The imaging device of claim 1, wherein the horizontal correction value portion for the pixel signal to be adjusted is an interpolation of the value of a horizontal correction value curve closest to one side of the pixel corresponding to the pixel signal to be adjusted and the value of a horizontal correction value curve closest to a second side of the pixel, at a column in which the pixel is located, when the pixel is located on a row between rows respectively associated with horizontal correction value curves.

8. The imaging device of claim 1, wherein each of the pluralities of vertical and horizontal correction value curves is represented as a piecewise-quadratic correction function.

9. The imaging device of claim 1, wherein each of the pluralities of vertical and horizontal correction value curves corresponds to a particular color channel of the pixel array, and wherein the vertical and horizontal correction value portions are based on vertical and horizontal correction value curves corresponding to the same color channel as the pixel signal to be adjusted.

10. A method of adjusting a value for a pixel of an image, comprising:
    inputting an image pixel signal value associated with a pixel to be adjusted;
    determining a location in a pixel array of the pixel to be adjusted; and
    adjusting the image pixel signal value, wherein the adjusting further comprises:
    determining a correction value for the pixel to be adjusted, the correction value being based on the location in the pixel array of the pixel to be adjusted, and at least one of a vertical correction value portion and a horizontal correction value portion; and
    applying the correction value to the pixel signal value,
    wherein the vertical correction value portion for the pixel to be adjusted is determined from at least one of a plurality of vertical correction value curves, the number of vertical correction value curves being less than the number of columns in the pixel array, each of the plurality of vertical correction value curves representing vertical correction value portions for all pixels in a particular column of the pixel array with which the respective vertical correction value curve is associated, and
    wherein the horizontal correction value portion for the pixel to be adjusted is determined from at least one of a plurality of horizontal correction value curves, the number of horizontal correction value curves being less than the number of rows in the pixel array, each of the plurality of horizontal correction value curves representing horizontal correction value portions for all pixels in a particular row of the pixel array with which the respective horizontal correction value curve is associated.

11. The method of claim 10, wherein the vertical correction value portion for the pixel to be adjusted is the value of the vertical correction value curve representing the column of the pixel corresponding to the pixel to be adjusted at a row in which the pixel is located, when the pixel is located on a column associated with a vertical correction value curve.

12. The method of claim 10, wherein the vertical correction value portion for the pixel to be adjusted is an extrapolation of the values of at least two vertical correction value curves closest to the pixel corresponding to the pixel to be adjusted at a row in which the pixel is located, when the pixel is located on a column to one side of all columns associated with vertical correction value curves.

13. The method of claim 10, wherein the vertical correction value portion for the pixel to be adjusted is an interpolation of the value of a vertical correction value curve closest to one side of the pixel corresponding to the pixel to be adjusted and the value of a vertical correction value curve closest to a second side of the pixel, at a row in which the pixel is located, when the pixel is located on a column between columns respectively associated with vertical correction value curves.

14. The method of claim 10, wherein the horizontal correction value portion for the pixel to be adjusted is the value of the horizontal correction value curve representing the row of the pixel corresponding to the pixel to be adjusted at a column in which the pixel is located, when the pixel is located on a row associated with a horizontal correction value curve.

15. The method of claim 10, wherein the horizontal correction value portion for the pixel to be adjusted is an extrapolation of the values of at least two horizontal correction value curves closest to the pixel corresponding to the pixel to be adjusted at a column in which the pixel is located, when the pixel is located on a row to one side of all rows associated with horizontal correction value curves.

16. The method of claim 10, wherein the horizontal correction value portion for the pixel to be adjusted is an interpolation of the value of a horizontal correction value curve closest to one side of the pixel corresponding to the pixel to be adjusted and the value of a horizontal correction value curve closest to a second side of the pixel, at a column in which the pixel is located, when the pixel is located on a row between rows respectively associated with horizontal correction value curves.

17. The method of claim 10, wherein each of the pluralities of vertical and horizontal correction value curves is represented as a piecewise-quadratic correction function.

18. The method of claim 10, wherein each of the pluralities of vertical and horizontal correction value curves corresponds to a particular color channel of the pixel array, and wherein the vertical and horizontal correction value portions are based on vertical and horizontal correction value curves corresponding to the same color channel as the pixel to be adjusted.

19. An imaging system comprising:
at least one stored first correction curve associated with columns of pixels of an image pixel array, the number of stored first correction curves being less than the number of columns of the pixel array;
at least one stored second correction curve associated with rows of pixels of the image pixel array, the number of stored second correction curves being less than the number of rows of the pixel array, wherein at least one of the columns and rows have a plurality of associated correction curves; and,
an image processor for determining a location of a pixel in the image pixel array and applying correction values thereto based on one or more of the first stored correction curves and one or more of the second stored correction curves.

20. The imaging system as in claim 19, further comprising a plurality of stored first and second correction curves.

21. The imaging system as in claim 20, wherein the image processor determines correction value associated with a first correction curve which corresponds to a column in which the pixel is located, or which corresponds to one or more columns which are closest to the column in which the pixel is located.

22. The imaging system as in claim 20, wherein the image processor determines a correction value associated with a second correction curve which corresponds to a row in which the pixel is located, or which corresponds to one or more rows which are closest to the row in which the pixel is located.

23. The imaging system as in claim 21, wherein the image processor interpolates a correction value for a pixel from first correction curves corresponding to columns closest to the column in which the pixel is located.

24. The imaging system as in claim 23, wherein the columns closest to the column in which the pixel is located are in columns to the left and right of the column in which the pixel is located.

25. The imaging system as in claim 22, wherein the image processor interpolates a correction value for a pixel from second correction curves corresponding to rows closest to the row in which the pixel is located.

26. The imaging system as in claim 25, wherein the rows closest to the row in which the pixel is located are in rows above and below the row in which the pixel is located.

* * * * *